United States Patent [19]

Walters

[11] 4,330,158

[45] May 18, 1982

[54] ROTARY ROCK BIT WITH IMPROVED THRUST FLANGE

[75] Inventor: D. F. Walters, Dallas, Tex.

[73] Assignee: Dresser Industries, Inc., Dallas, Tex.

[21] Appl. No.: 195,469

[22] Filed: Oct. 9, 1980

[51] Int. Cl.³ .......................... F16C 33/10; E21B 9/08
[52] U.S. Cl. .................................... 308/8.2; 175/227; 175/371
[58] Field of Search ................. 308/8.2; 175/227, 228, 175/229, 371, 372

[56] References Cited

U.S. PATENT DOCUMENTS

| | | | |
|---|---|---|---|
| 3,721,307 | 3/1973 | Mayo | 308/8.2 |
| 3,866,987 | 2/1975 | Garner | 308/8.2 |
| 3,995,917 | 12/1976 | Quinlan | 308/8.2 |
| 4,061,376 | 12/1977 | Villaloboz | 308/8.2 |
| 4,252,383 | 2/1981 | Simpson | 308/8.2 |
| 4,272,134 | 6/1981 | Levefelt | 308/8.2 |

FOREIGN PATENT DOCUMENTS 2300931  9/1976  France ............................ 308/8.2

Primary Examiner—Richard R. Stearns
Attorney, Agent, or Firm—Fred A. Winans

[57] ABSTRACT

A rolling cone cutter earth boring bit is provided having a pair of facing thrust bearing surfaces, one such surface on the rolling cone and the other surface on the journal pin. The latter surface defines an annular groove which has separate arcuate segments thereof filled with a hardfacing material and machined to provide a complimentary engaging surface with the cone thrust bearing surface. The spaces in the groove between the hardfacing segments define pockets providing lubricant reservoirs and debris traps for the immediately adjacent thrust bearing surfaces.

4 Claims, 4 Drawing Figures

ROTARY ROCK BIT WITH IMPROVED THRUST FLANGE

BACKGROUND OF THE INVENTION

1. Field of the Invention

The present invention relates in general to rotary earth boring bits and, more particularly, to an improved thrust bearing surface between the bearing pin and the rotatable cone of the bit.

2. Brief Description of the Prior Art

A rotary rock bit generally comprises a main bit body adapted to be connected to a rotary drill string. The bit includes individual rotatable cone cutters mounted on bearing pins extending downwardly from an arm of the main bit body. Bearing systems are provided between each cone cutter and the associated bearing pin to reduce friction from rotation of the cutter as the bit and the cutters rotate during drilling. In order to obtain acceptable penetration rates with a rotary rock bit in some formations, it is necessary to apply heavy loads on the bit and to operate the bit at moderate speed. With other formations only moderate loads are required, but the bit must be operated at relatively high speeds.

Also, the rotary rock bit operates under a highly abrasive and corrosive environment and is subjected to temperature extremes as the drilling operation is often conducted thousands of feet underground wherein elevated temperatures are encountered. The bit is cooled by continually flushing its exterior with a circulating drilling fluid which also carrys away the drill cuttings. This fluid is generally corrosive and quite damaging to bearing surfaces should it have access to them.

Thus, in view of these circumstances, it can be appreciated that a bearing system for a rotary rock bit must be constructed so that it will provide exceptional performance characteristics within a limited geometrical configuration. Since the entire drill string must be withdrawn to replace a bit should it fail, it is highly desirable to have the bearing systems of the bit operate for an extended period of time.

The development of journal bearing rotary rock bits has included the use of matched radial surfaces perpendicular to the axis of rotation between the pin and the cone cutter as thrust bearing surfaces. The radial surface on the journal pin usually contains a circular groove surrounding the pilot pin extending axially from this surface. Heretofore, when such groove was present it was completely filled with a hardmetal which has a demonstrated ability to withstand wear but which is much more expensive than the metal of the journal pin. To decrease wear, the facing radial surface in the cone cutter may be carburized and may contain various indentations such as slots or drilled recesses containing a relatively soft alloy metal such as copper, silver, beryllium-copper, or aluminum-bronze to form a bearing pair with hardmetal against soft metal.

It has also been demonstrated in the prior art to provide a sealed lubricant reservoir and lubricant distribution system for supplying lubricant to the various bearing surfaces between the journal pin and the cone cutter. Such lubrication systems typically includes a flexible diaphragm having one side facing the lubricant and the other side open to the bit exterior for equalizing pressure between the interior and exterior of the bit and permits lubricant from the reservoir, to be supplied through the lubricant passages to the bearing areas as the drill is rotated in the hole. In addition, it is common practice to grease each bearing with a "smear grease" prior to assembly of the cone cutter on the pin.

In U.S. Pat. No. 3,235,316 to J. R. Whanger, patented Feb. 15, 1966, a journal thrust bearing for a rock bit is shown with alternating surface areas of wear-resistant and anti-galling materials. The bearing system disclosed therein includes grooves in the bearing surface of the rotatable member filled with a soft metal having anti-galling characteristics to further reduce friction between the two surfaces.

SUMMARY OF THE INVENTION

The present invention provides a rolling cone cutter each boring bit having opposed thrust flange bearing surfaces on the pin and rotating cone cutter. The bearing surface of the pin defines a concentric groove having separate arcuate segments or portions thereof filled with a hardmetal material and machined to the general plane of the thrust bearing surface to define a mating surface for the thrust bearing surface of the cone cutter comprising a plurality of arcuate hardmetal bearing areas. The voids or pockets between the arcuate segments of metal provide lubricant reservoirs immediately adjacent each separate bearing portion which are filled with "smear grease" and also provide debris traps into which wear debris can be deposited before it damages the machined mating bearing surfaces. The hardmetal material deposited in the groove also defines abrupt corners at the downstream end of each void or pocket to minimize the re-introduction of the wear debris into the bearing surfaces and defines relieved portions in the upstream end to replenish lubricant (i.e. smear grease) with lubricant from the pressurized reservoir. Also, in that the groove is only intermittently filled over certain arcuate segments thereof with the hardmetal material, the use of this expensive material is minimized, however, a better bearing is produced thereby.

DESCRIPTION OF THE PREFERRED EMBODIMENT

Figure 1:
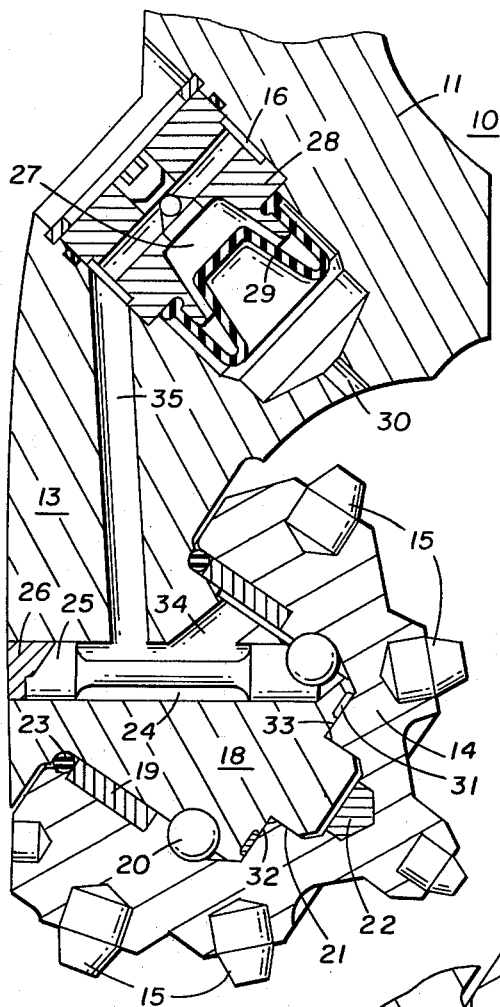
FIG. 1 is a cross-sectional view of one arm of an earth boring bit generally along the vertical axis thereof in accordance with the present invention.

Referring now to FIG. 1, the cross-sectional view of one arm 13 of a three-cone rotary rock bit 10 is shown. It is to be understood that the bit includes two other similar arms extending downwardly from bit body 11 and constructed according to the arm described herebelow.

A rolling cone cutter 14 is rotatably positioned on the journal portion or journal bearing pin 18 of the arm 13. As the cone rotates, the cutting structure 15 on the surface of cutter 14 contacts and fractures the formations in a manner that is well known in the art. The cutting structure 15 is shown in a form of sintered tungsten carbide inserts. However, it is to be understood that other cutting structures such as steel teeth may be used on the cone cutter 14.

The body of the bit 10 includes an upper threaded portion that allows the bit to be connected to the end of a rotary drill string and further includes a central passageway extending along the axis of the bit to allow drilling fluid to enter from the upper section of the drill string (such structure not shown but well known in the art). The drilling fluid exits the bit body above the cutters and passes downwardly to the bottom of the well bore to flush cuttings and drilling debris from the well bore.

A bearing system defining a plurality of bearings is located in the area between the cutter 14 and the bearing pin 18. The bearings include an outer friction bearing 19, a series of ball bearings 20, an inner friction bearing 21, and a thrust button 22. A suitable seal such as O-ring 23 is positioned between the cutter 14 and the bearing pin 18. This seal retains lubricant in the bearing system and prevents any materials in the well bore from entering the bearing area. A passageway 24 allows the balls that make up the ball bearing system 20 to be inserted into position after the cone cutter is placed on the bearing pin 18. The series of ball bearings 20 serves to lock the cone cutter 14 on the bearing pin 18. After the balls are in place, a plug 25 is inserted into the passageway 24 and welded therein by weld 26. Plug 25 has a reduced diameter throughout the major portion of its length to allow lubricant to flow through the passageway 24.

A cylindrical reservoir chamber 16 is located in the bit body 11. A lubricant reservoir 27 containing a suitable lubricant is positioned in the chamber 16. The lubricant reservoir 27 consists of a lubricant canister 28 with a flexible diaphragm 29 attached. A vent passage 30 allows the pressure of the fluid in the borehole to be transmitted to the flexible diaphragm 29. A passage 35 extends from the chamber 16 to the bearing area between the cutter 14 and the bearing pin 18. Lubricant in the reservoir 27 can thus flow through the passage 35 to the bearing areas through passages 24 and 34 in the journal pin.

Development of journal bearing rock bits has included the use of matched facing engaging radial surfaces 32 and 33 on the pin and cone respectively as thrust bearing surfaces. The radial surface 32 on the bearing pin is generally known as the journal inner flange. Heretofore, this flange contained a circular groove such as 31 substantially completely filled with a hardmetal which has a known, demonstrated ability to reduce friction and to withstand wear. The groove acts as a dam in which the hardmetal could be applied, as by melting therein, and after solidifying, machined to the proper surface finish and dimension. The matching radial surface 33 in the cone is carburized to provide a harder face than normal steel.

As is shown in FIG. 1, the thrust flange surface 32 on the bearing pin 18 engages the thrust flange surface 33 on the inside of the cone cutter thereby, together with other surfaces in the bearing system, transmitting the downward weight and force of the drill string to the cone cutter 14.

Figure 2:
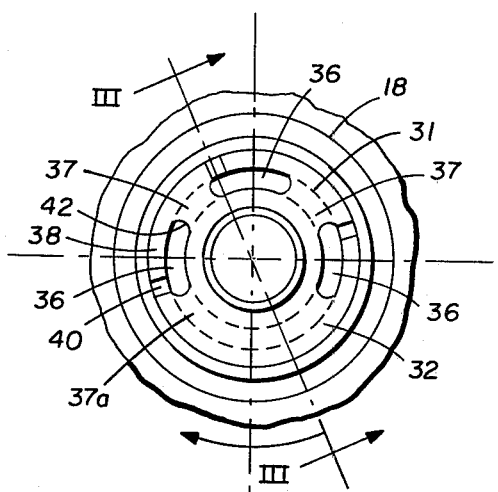
FIG. 2 is a plan view of the thrust flange of the journal pin shown in FIG. 1.
Figure 3:
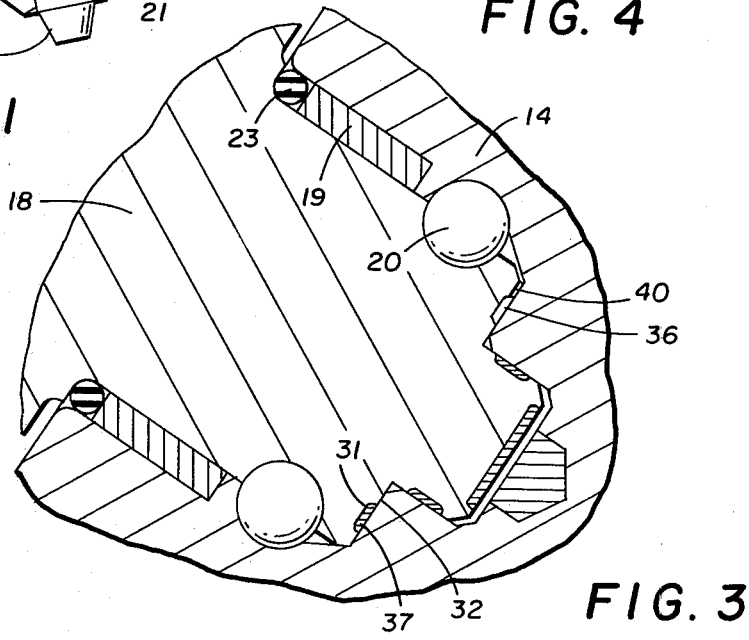
FIG. 3 is an enlarged cross-sectional view along line III—III of FIG. 2.

Referring now to FIGS. 2 and 3, the journal pin 18 is illustrated in more detail showing the thrust flange 32. The present invention prevents or reduces avalanche wear (generally defined as wear caused by a separate particle or an asperity on one of the engaging surfaces adhereing or cold welding to a bearing surface, causing localized damage to the bearing surface and creating new transferred or loose wear debris particles and each such particle in turn creating additional bearing damage and more particles in a geometric progression) between the thrust bearing surfaces 32 and 33 by providing readily accessible voids or pockets 36 which act as debris traps for wear debris and contaminant particles between the arcuate segments 37 of the hardmetal material. (Contaminant particles are sometimes present from manufacturing and handling of the parts during assembly.) These pockets also act as lubricant reservoirs to supply or replenish lubricant lost from between the engaging surfaces 32 and 33. Further, the reduced use of the more expensive hardmetal material within the groove 31 minimizes the amount of such material required to provide the bearing surface.

As is seen in FIG. 2, it is preferred that segments 37 having specific angular orientation of the groove 31 are filled with the hardmetal material. Thus, the lowermost portion of the groove 31 (as determined when the bit is in its vertical operating position) is filled over an included angle of approximately 145° to provide hardmetal thrust bearing segment 37a as this is the area which receives the greatest thrust load (shown as the downward arrow of FIG. 2) during the drilling operation. The remaining 215° of the annular groove 31 are alternately voids 36 and filled segments 37 of generally equal extent. Further, it is seen that the outside wall 38 of the groove 31 adjacent each upstream portion of the void or pocket (in the direction of rotation of the cone as indicated by the arcuate arrow of FIG. 2) is slightly relieved as at 40. It is anticipated that rotation of the cone 14 on the pin 18 will produce some wobble (especially after some wear occurs) therebetween so that the thrust flange surfaces 32 and 33 of the respective pin and cone become occasionally spacially separated during rotation. When in the spaced relationship, it is expected that lubricant will enter therebetween to replenish any smear grease that has been lost from between the thrust bearing surfaces; however, the relieved portion 40 also provides and insures an opening for the ingress of the lubricant to the pockets 37 to replace lubricant removed therefrom to the bearing surfaces. Further, the relieved portion 40 is placed in an area (i.e. upstream with relation to the direction of rotation of the cone) where wear debris and contaminant particles, which will be forced to the downstream area by the rotation of the cone 14, cannot escape for recirculation.

Figure 4:
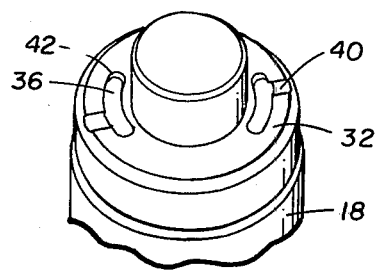
FIG. 4 is an isometric view of the thrust flange of the journal pin of FIG. 1.

Referring now to FIG. 4, the thrust bearing surface 32 of the bearing pin 18 is shown in perspective. As therein seen the downstream shoulder 42 defining the initial edge or shoulder of the hardmetal material of segment 37 in the groove has a relatively steep shoulder (i.e. having an essentially axially extending face terminating in a sharp corner at the top or bearing surface 32) to facilitate retention of the wear debris within the pocket.

Thus, there is provided a thrust bearing surface in the pin which uses a minimum of hardmetal material and further provides lubricant reservoirs for replenishing the lubricant supply between the thrust bearing surfaces 32 and 33 and also acts as a plurality of readily accessable debris traps for eliminating wear debris and contaminant particles from between the engaging surfaces before such debris has an opportunity to traverse the bearing surfaces over any great extent, with the pockets 36 placed at regular and frequent intervals, to thereby minimize avalanche wear.

The embodiments of the invention in which an exclusive property or privilege is claimed are defined as follows:

1. In an improved earth boring bit having a bit body providing a cutter arm with a bearing pin extending downwardly therefrom and defining a rolling axis and a rolling cone cutter rotatably mounted on said pin, said pin and said cutter respectively defining radially extending annular facing surfaces and said bit having a lubricant distribution system for delivering lubricant to said surfaces wherein said improvement comprises:

said annular surface of said cutter defining a first thrust bearing surface;

said annular surface of said pin providing an axially open annular groove with a plurality of arcuate segments of said groove filled with a hardmetal material to define thereby separate arcuate segments providing a hardmetal bearing surface separated by separate arcuate segments defining voids or pockets therebetween; and wherein said voids provide circumferential openings between said arcuate portions providing lubricant reservoirs for the ingress of lubricant to the thrust bearing surfaces during rotation of said cone to replenish lubricant therebetween, said voids further providing debris traps for the wear debris and contaminant particles.

2. Structure according to claim 1 including radially facing openings into the upstream portion of said voids.

3. Structure according to claim 1 wherein each filled segment defines an axially extending surface within said groove facing into the direction of rotation of the cutter to provide a generally sharp corner with the bearing surface of said segment wherein said sharp corners minimize the escape of debris therefrom.

4. Structure according to claim 1 wherein at least one of said segments fills the lowermost portion of said groove over a greater arcuate extent than the remaining segments.

* * * * *